United States Patent
Liang

(10) Patent No.: US 8,249,680 B2
(45) Date of Patent: Aug. 21, 2012

(54) ROTATING MECHANISM AND ELECTRONIC DEVICE USING SAME

(75) Inventor: Shi-Xu Liang, Shenzhen (CN)

(73) Assignees: Shenzhen Futaihong Precision Industry Co., Ltd., ShenZhen, Guangdong Provine (CN); FIH (Hong Kong) Limited, Kowloon (HK)

( * ) Notice: Subject to any disclaimer, the term of this patent is extended or adjusted under 35 U.S.C. 154(b) by 193 days.

(21) Appl. No.: 12/862,860

(22) Filed: Aug. 25, 2010

(65) Prior Publication Data

US 2011/0287817 A1   Nov. 24, 2011

(30) Foreign Application Priority Data

May 20, 2010   (CN) .......................... 2010 1 0178174

(51) Int. Cl.
*H04M 1/00*   (2006.01)
(52) U.S. Cl. .................. 455/575.8; 455/575.1
(58) Field of Classification Search .... 455/575.1–575.8, 455/90.1–90.3, 344–349; 361/679.01, 679.06, 361/679.07, 679.56; 16/380, 381, 382, 384, 16/386, 387, 376, 377

See application file for complete search history.

(56) References Cited

U.S. PATENT DOCUMENTS

| | | | | |
|---|---|---|---|---|
| 7,653,422 | B2 * | 1/2010 | Roberts ...................... | 455/575.4 |
| 2005/0197173 | A1 * | 9/2005 | Wee et al. ................... | 455/550.1 |
| 2006/0046792 | A1 * | 3/2006 | Hassemer et al. ......... | 455/575.1 |
| 2007/0293286 | A1 * | 12/2007 | Park et al. .................. | 455/575.1 |
| 2008/0242380 | A1 * | 10/2008 | Kajihara et al. ........... | 455/575.2 |
| 2009/0029748 | A1 * | 1/2009 | Lee ............................. | 455/575.4 |

* cited by examiner

*Primary Examiner* — Lana N Le
(74) *Attorney, Agent, or Firm* — Altis Law Group, Inc.

(57) ABSTRACT

A rotating mechanism comprises a retaining plate, a rotating plate, a rotation enabling member and a biasing member. The rotation enabling member comprising a rail, a track, a guiding post and a guiding groove. The biasing member comprising a first biasing member end and a second biasing member end. The first biasing member end is retained on the retaining plate and the second biasing member end is retained on the rail. When the rotating plate rotates from a first state to an intermediate state, the biasing member is compressed by the rail to exert a force on the rotating plate and the retaining plate causing the rotating plate to automatically rotate toward an third state once the rotating plate passes the intermediate state.

20 Claims, 6 Drawing Sheets

ROTATING MECHANISM AND ELECTRONIC DEVICE USING SAME

CROSS-REFERENCE TO RELATED APPLICATIONS

This application is related to co-pending U.S. patent application Ser. Nos. 12/862,858, 12/862,859 AND 12/862,861), all entitled "ROTATING MECHANISM AND ELECTRONIC DEVICE USING SAME", by Liang Shi-Xu. These applications have the same assignee as the present application and have been concurrently filed herewith. The above-identified applications are incorporated herein by reference.

BACKGROUND

1. Technical Field

This disclosure relates to rotating mechanisms, particularly to rotating mechanisms used in an electronic device.

2. Description of Related Art

A typical portable electronic device, such as a mobile phone, generally includes a lower element and an upper element with a display mounted thereon. However, many conventional electronic devices use complicated components and methods to enable relative rotation between the upper and lower elements.

Therefore, there is a room for improved in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary rotating mechanism for electronic device. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
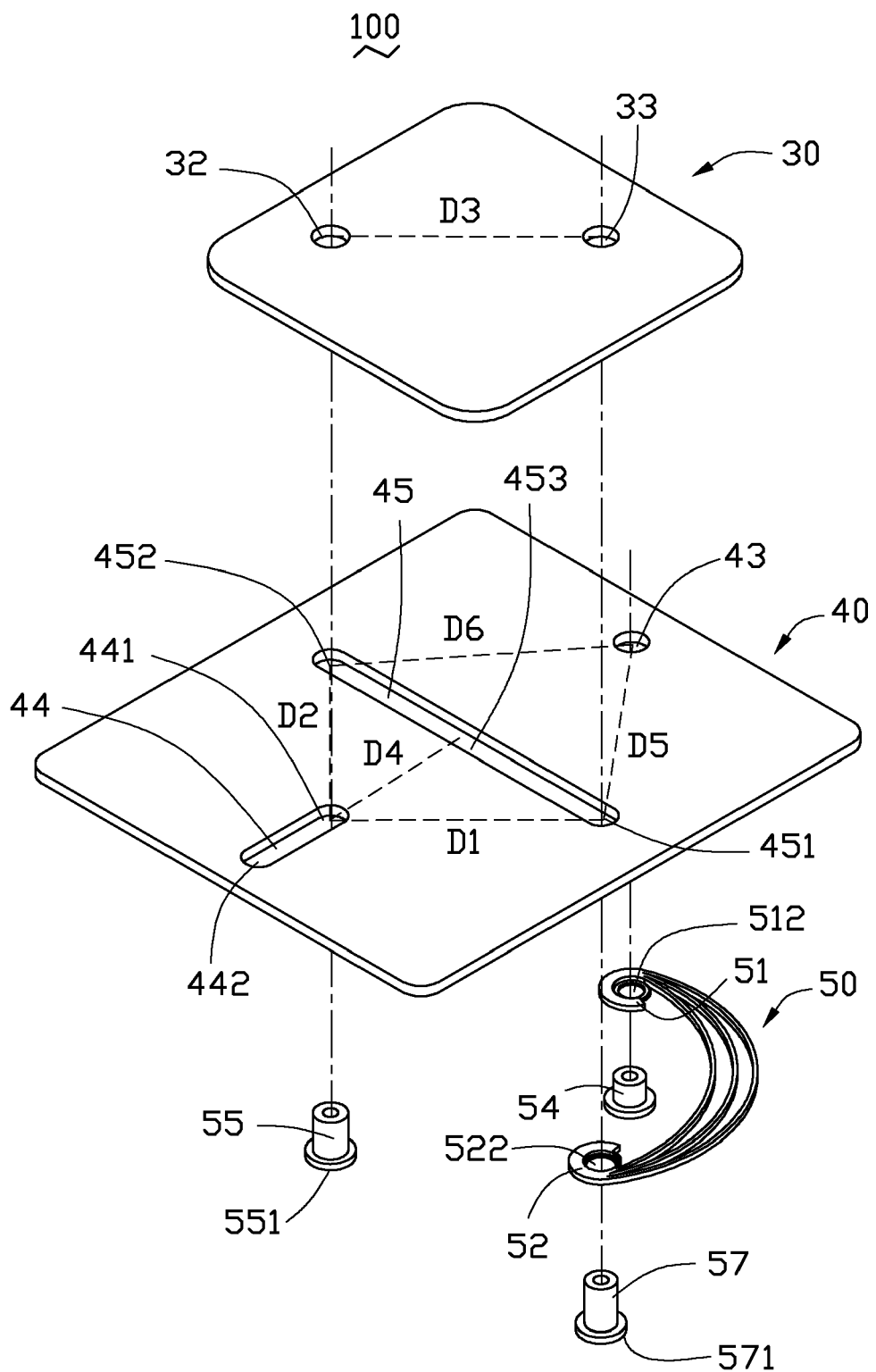
FIG. 1 is an exploded view of an exemplary embodiment of a rotating mechanism.
Figure 2:
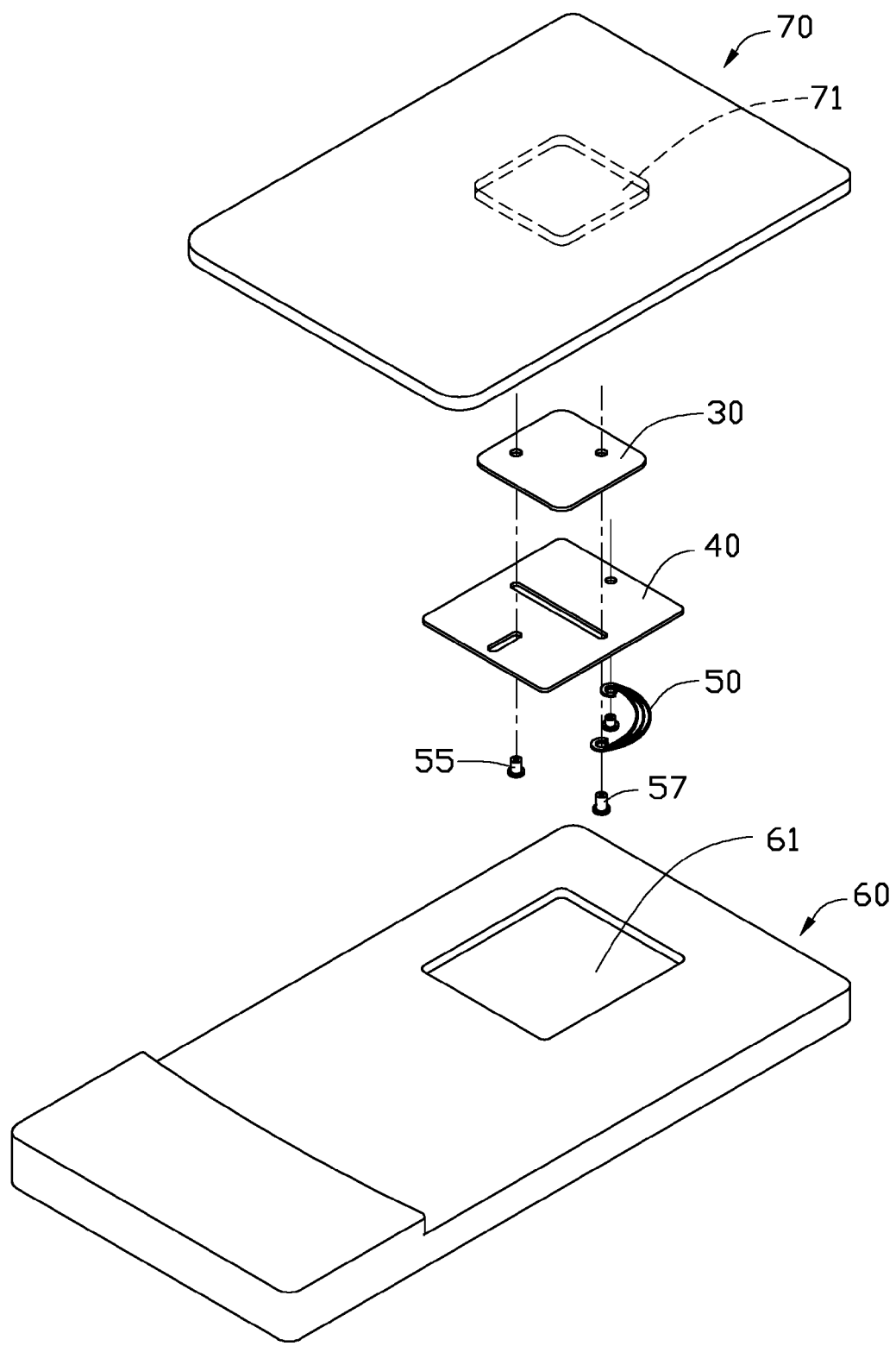
FIG. 2 is an exploded view of an electronic device using the rotating mechanism shown in FIG. 1.

FIG. 1 illustrates an exploded view of an exemplary rotating mechanism 100. FIG. 2 illustrates an exploded view of an electronic device (not labeled) using the rotating mechanism 100 shown in FIG. 1. The electronic device includes an upper housing 70 and a lower housing 60, which are connected by the rotating mechanism 100. The upper housing 70 defines a receptacle 71 facing the lower housing 60 and the lower housing 60 defines a compartment 61 facing to the receptacle 71. The receptacle 71 and the compartment 61 are cooperatively accommodate the rotating mechanism 100.

The rotating mechanism 100 includes a retaining plate 40 and a rotating plate 30 which are rotatably coupled by a rotation enabling member (not labeled). The retaining plate 40 is mounted to the lower housing 60 and the rotating plate 30 is mounted to the upper housing 70 so the upper housing 70 can rotate with the rotating plate 30 relative to the lower housing 60 when the rotating plate 30 rotates relative to the retaining plate 40. The rotation enabling member is coupled between the retaining plate 40 and the rotating plate 30 so the rotating plate 30 rotatably engages with the retaining plate 40. The rotation enabling member, in this exemplary embodiment, comprises a rail 57, a track 45 that engages the rail 57, a guiding post 55, a guiding groove 44 that engages the guiding post 55, and a biasing member 50 exerts a force on the rail 57 so the rail 57 can automatically slide relative to the track 45 and the guiding post 55 can automatically slide relative to the guiding groove 44. The rail 57 is retained on or rotatably affixed to the rotating plate 30 extending into the track 45; in this exemplary embodiment, the rail 57 is retained in a retaining hole 33 defined in the rotating plate 30. A distal end 571 of the rail 57 is wider than the track 45 such that the rail 57 will not pass through the track 45 thereby retaining the rotating plate 30 to the retaining plate 40. As the rotating plate 30 rotates in a plane parallel to the plane of the retaining plate 40, the rail 57/track 45 combination prevent the separation of the rotating plate 30 and the retaining plate 40. The track 45 is a groove defined in the retaining plate 40 and extends along a first direction, including a track end 451 and a second track end 452. The rail 57 slides from the first track end 451 to the second track end 452 when the rotating plate 30 rotates about the guiding post 55 relative to the retaining plate 40 from a first state shown in FIG. 4 to an intermediate state shown in FIG. 5 and a third state shown in FIG. 6.

The guiding post 55 is retained on or rotatably affixed to the rotating plate 30 extending into the guiding groove 44; in this exemplary embodiment, the guiding post 55 is retained in a securing hole 32 defined in the rotating plate 30. The guiding post 55 is slightly smaller than the guiding groove 44 so the guiding post 55 can slide and rotate in the guiding groove 44. A distal end 551 of the guiding post 55 is wider than the guiding groove 44 such that the guiding post 55 will not pass through the guiding groove 44 thereby retaining the rotating plate 30 to the retaining plate 40. As the rotating plate 30 rotates relative to the retaining plate 40, the guiding post 55/guiding groove 44 combination prevent the separation of the rotating plate 30 and the retaining plate 40. The guiding groove 44 is defined in the retaining plate 40 and extends along a second direction perpendicular to the first second direction, including a first guiding groove end 441 and a second guiding groove end 442. The guiding post 55 rotates in the guiding groove 44 and slides from the first guiding groove end 441 to the second guiding groove end 442 when the rotating plate 30 rotates relative to the retaining plate 40 from the first state shown in FIG. 4 to the intermediate state shown in FIG. 5; and the guiding post 55 slides from the second guiding groove end 442 to the first guiding groove end 441 again when the rotating plate 30 rotates relative to the retaining plate 40 from the intermediate state shown in FIG. 5 to the third state shown in FIG. 6. In this exemplary embodiment, the guiding groove 44 is spaced apart from the track 45, and the distance D1 between the first track end 451 and the first guiding groove end 441 is equal to the distance D2 between the second track end 452 and the first guiding groove end 441. The distance D3 between the securing hole 32 and the retaining hole 33 is equal to/smaller than the distance D4 between the second guiding groove end 442 and the center portion of the track 45 so when the rotating mechanism 100 is in the intermediate state shown in FIG. 5, the guiding post 55 can locate at/near the second guiding groove end 442.

Figure 3:
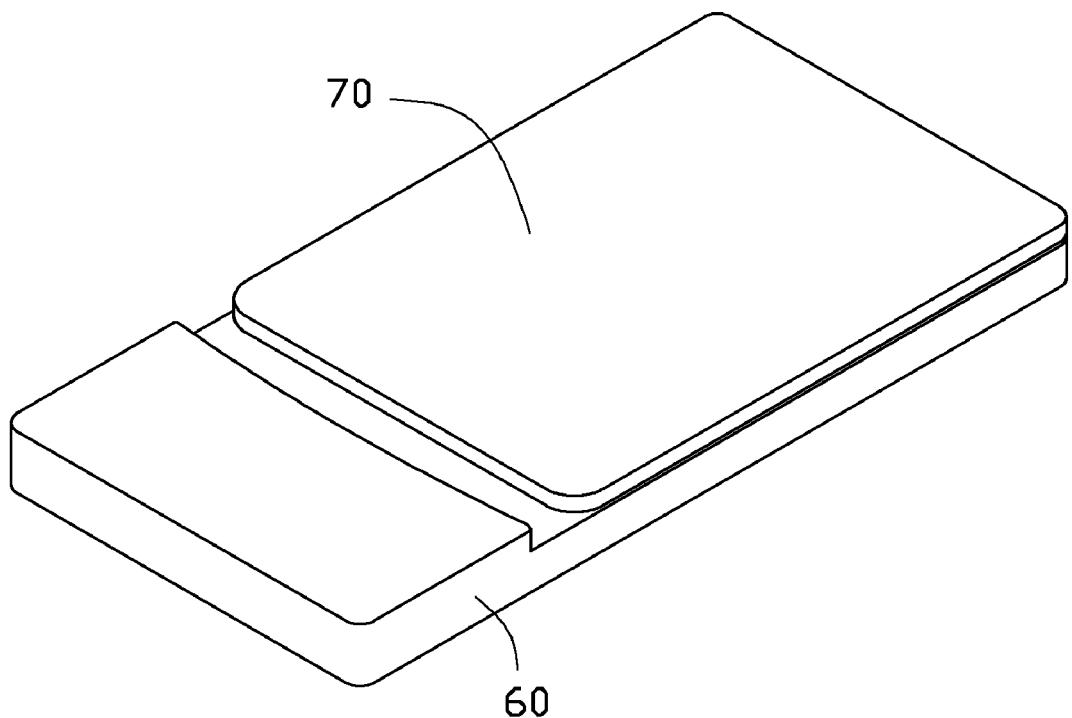
FIG. 3 is an assembled view of the electronic device shown in FIG. 2.

Referring to FIGS. 1 and 3, the biasing member 50 is couple between the rotating plate 30 and the retaining plate 40. When the rotating plate 30 rotates from a first (e.g., the closed) state shown in FIG. 4 to the intermediate state shown in FIG. 5, the biasing member 50 is compressed to exert a force on the rotating plate 30 and the retaining plate 40; once the rotating plate 30 rotates a predetermined amount and crosses the intermediate state shown in FIG. 5, the rotating plate 30 automatically further rotates toward a third (e.g., the open) state shown in FIG. 6 under the force of compressed biasing member 50. The biasing member 50 may be a compressed spring, which has a first biasing member end 51 retained to the rotating plate 30 and a second biasing member end 52 retained to the retaining plate 40. The first biasing member end 51 defines a first latching hole 512, the retaining plate 40 defines a retaining bore 43, and a retaining post 54 is inserted in the first latching hole 512 and the retaining bore 43 so the first biasing member end 52 is retained to the retaining plate 40. The second biasing member end 52 defines a second latching hole 522, and the rail 57 inserts through the second latching hole 522 so the second biasing member end 52 retains to the rotating plate 30. In this exemplary embodiment, the retaining bore 43 is spaced apart from the track 45 and locates at another side of the track 45 opposite to the guiding groove 44, and the distance D5 between the retaining bore 43 and the first track end 451 is equal to the distance D6 between the retaining bore 43 and the second track end 452.

Referring to FIGS. 1-4, in assembly, the first latching hole 512 is aligned with the retaining bore 43, and then the retaining post 54 is inserted in the first latching hole 512 and the retaining bore 43 to retain the first biasing member end 51 to the retaining bore 43. The second latching hole 522 is aligned with the first track end 451 and the retaining hole 33, and then the rail 57 is inserted in the first latching hole 512, the first track end 451 and the retaining hole 33 so the first biasing member end 51 is retained in the retaining hole 33 and the track 45. The first guiding groove end 441 is aligned with the securing hole 32, and then the guiding pole 55 is inserted in the first guiding groove end 441 and the securing hole 32 so the guiding pole 55 is retained on the rotating plate and extends in the guiding groove 44. Finally, the rotating plate 30 is retained in the receptacle 71 to mount the rotating plate 30 to the upper housing 70 and the retaining plate 40 is retained in the compartment 61 to mount the retaining plate 40 to the lower housing 60.

Figure 4:
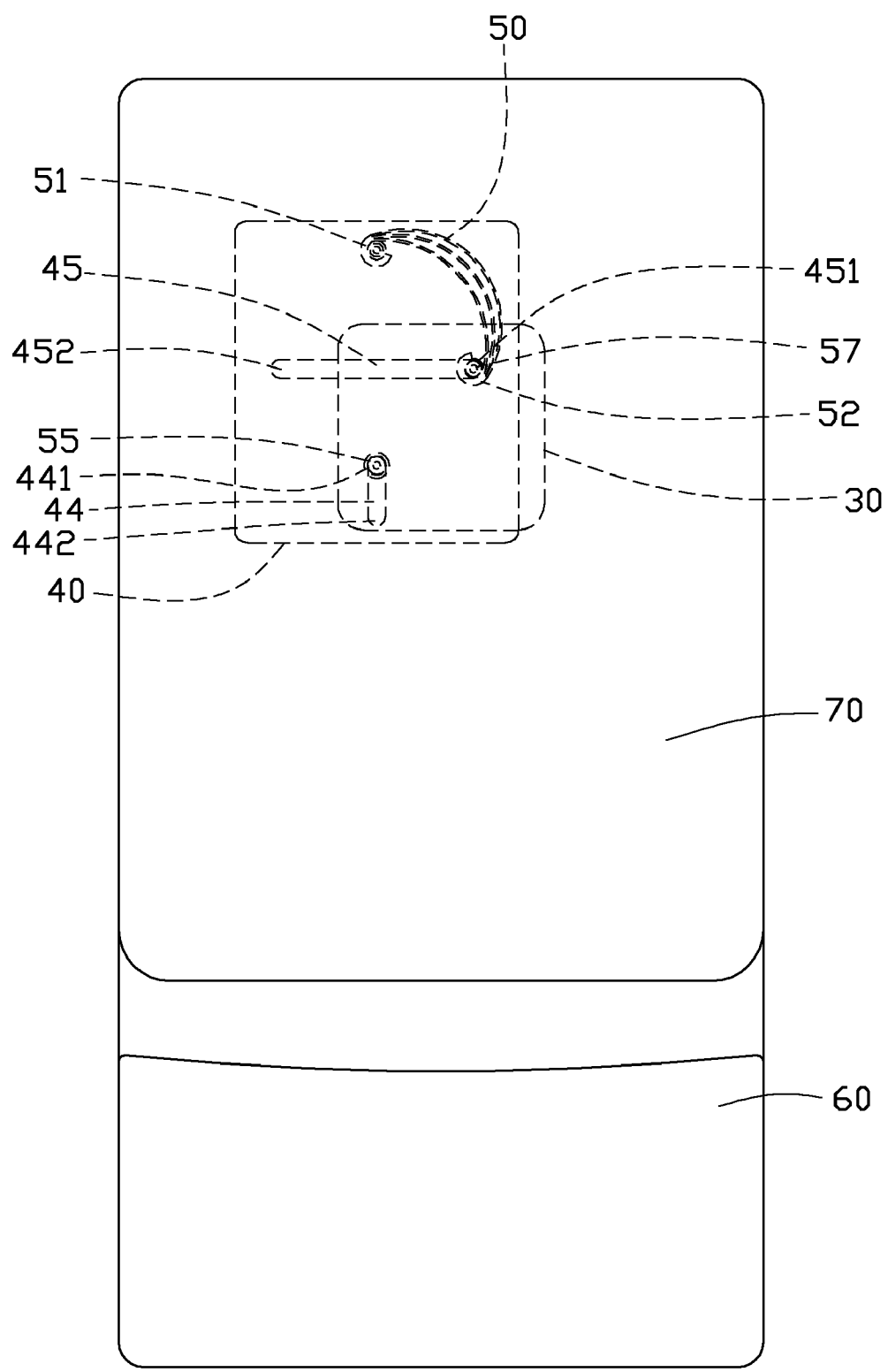
FIG. 4 is an assembled and partially perspective view of the electronic device in a first position.
Figure 5:
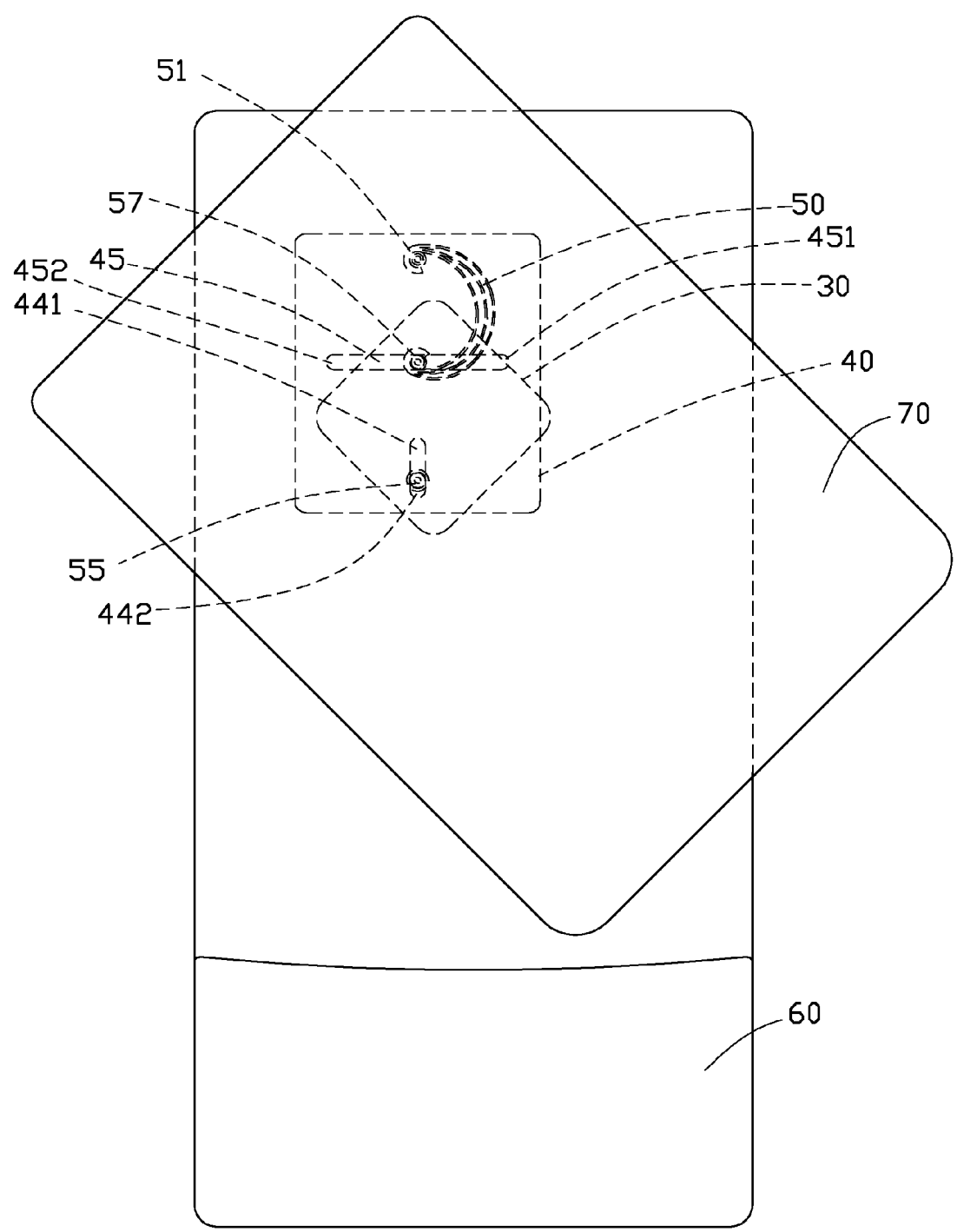
FIG. 5 is an assembled and partially perspective view of the electronic device in an intermediate position.
Figure 6:
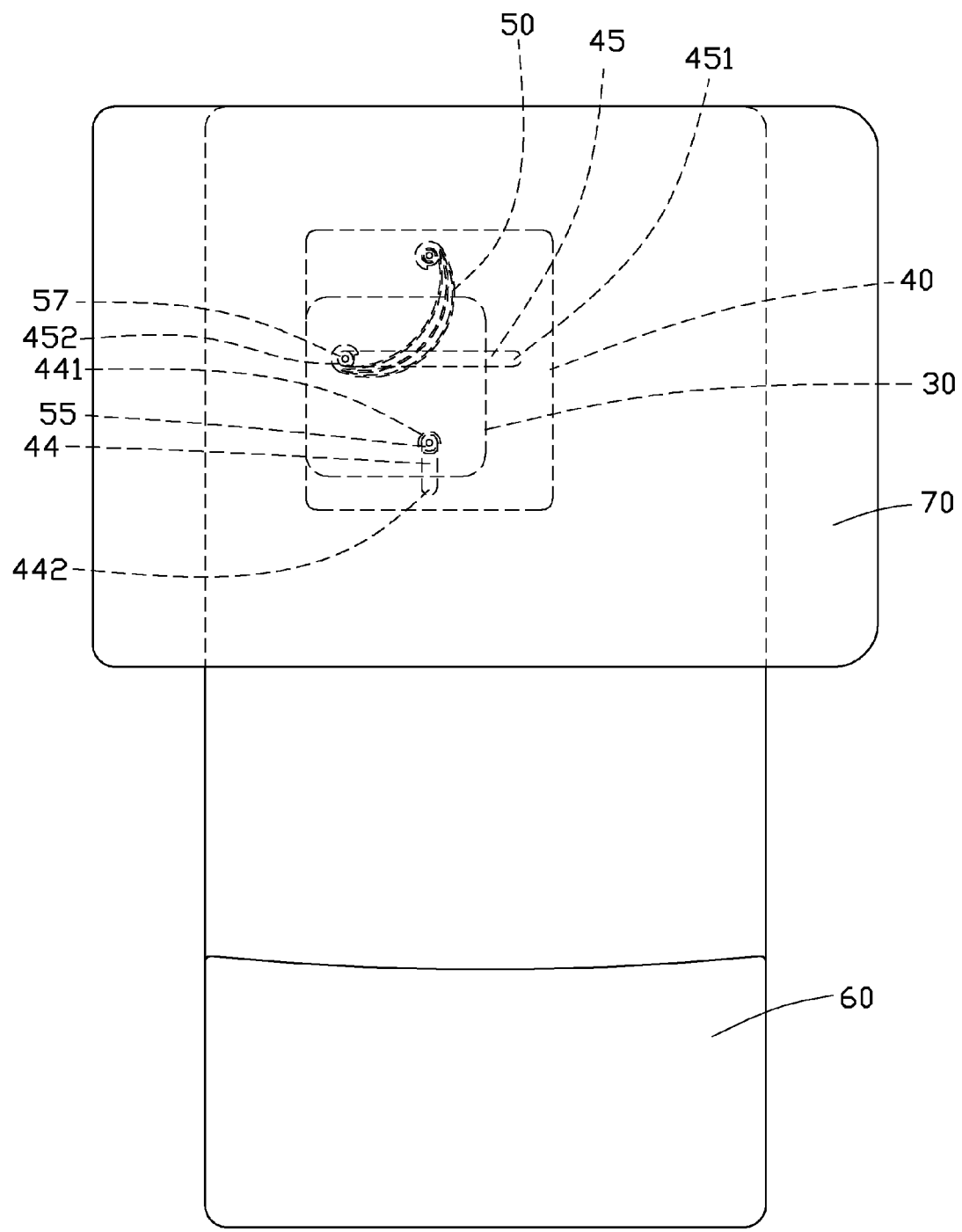
FIG. 6 is an assembled and partially perspective view of the electronic device in a third position.

Referring to FIGS. 4-6, in use, the upper housing 70 can rotates relative to the lower housing 60 with the rotating plate 30 rotating relative to the retaining plate 40. At this time, the rail 57 slides from the first track end 451 toward the second track end 452, the guiding post 55 slides from the first guiding groove end 441 to the second guiding groove end 442 and the biasing member 50 is compressed. When the rail 57 slides to and crosses the center portion of the track 45 and the guiding post 55 slides to the second guiding groove end 442; the biasing member 50 is expanded, the rail 57 automatically slides in the track 45 to the second track end 452 and the guiding post 55 restores to the first guiding groove 441 so the rotating plate 30 is rotated about the guiding post 55 relative to the retaining plate 40. Thus, the upper housing 70 is rotated relative to the lower housing 60 like shown in FIG. 6.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A rotating mechanism, comprising:
   a retaining plate having a track defined therethrough and extending along a first direction, the retaining plate having a guiding groove defined therethrough and extending along a second direction perpendicular to the first direction;
   a rotating plate;
   a rail slidably engaging with the track and retained on the rotating plate;
   a guiding post retained on the rotating plate and slidably engaging with the guiding groove, the rotating plate being capable of rotating in a plane parallel to the plane of the retaining plate by the guiding post;
   a biasing member comprising a first biasing member end and a second biasing member end, the first biasing member end retained on the retaining plate and the second biasing member end retained on the rail, the biasing member exerting a force on the rotating plate and retaining plate causing the rotating plate to automatically rotate after the rotating plate rotates a predetermined amount.

2. The rotating mechanism claimed in claim 1, wherein a distal end of the rail is wider than the track such that the rail will not pass through the track thereby retaining the rotating plate to the retaining plate.

3. The rotating mechanism claimed in claim 1, wherein the first biasing member end defines a first latching hole, the retaining plate defines a retaining bore; a retaining post is inserted in the first latching hole and the retaining bore to retain the first biasing member end to the retaining plate.

4. The rotating mechanism claimed in claim 3, wherein the retaining bore is spaced apart from the track, the track includes a first track end and a second track end; the distance between the retaining bore and the first track end is equal to the distance between the retaining bore and the second track end.

5. The rotating mechanism claimed in claim 4, wherein the rail slides from the first track end to the second track end when the rotating plate rotates relative to the retaining plate between a first state shown and an third state.

6. The rotating mechanism claimed in claim 5, wherein the guiding groove includes a first guiding groove end and a second guiding groove end; the guiding post slides from the first guiding groove end to the second guiding groove end when the rotating plate rotates relative to the retaining plate from the first state to the intermediate state; and the guiding post slides from the second guiding groove end to the first guiding groove end when the rotating plate rotates relative to the retaining plate from an intermediate state to the third state.

7. The rotating mechanism claimed in claim 6, wherein the guiding post is retained in a securing hole defined in the rotating plate.

8. The rotating mechanism claimed in claim 7, wherein the guiding groove is spaced apart from the track, and the distance between the first track end and the first guiding groove end is equal to the distance between the second track end and the first guiding groove end.

9. The rotating mechanism claimed in claim 8, wherein the distance between the securing hole and the retaining hole is equal to the distance between the second guiding groove end and a center portion of the track so when the rotating mechanism is in the intermediate state, the guiding post can locate at the second guiding groove end.

10. The rotating mechanism claimed in claim 8, wherein the distance between the securing hole and the retaining hole is smaller than the distance between the second guiding groove end and a center portion of the track so when the rotating mechanism is in the intermediate state, the guiding post can locate near the second guiding groove end.

11. The rotating mechanism claimed in claim 1, wherein the second biasing member end defines a second latching hole, and the rail inserts through the second latching hole to retain the second biasing member end to the rail.

12. A rotating mechanism, comprising:
a retaining plate;
a rotating plate;
a rotation enabling member comprising a rail, a track that engages the rail, a guiding post and a guiding groove that engages the guiding post, wherein the rail is rotatably affixed to the rotating plate and extends into the track, the track is defined in the retaining plate along a first direction and includes a first track end, a second track end and a center portion, the guiding post is positioned on the rotating plate and extends into the guiding groove, the guiding groove is defined in the retaining plate along a second direction perpendicular to the first direction, the guiding groove includes a first guiding groove end and a second guiding groove end;
a biasing member coupled between the rotating plate and the retaining plate to exert a force on the rotating plate and the retaining plate;
Wherein the rotating plate is capable of rotating in a plane parallel to the plane of the retaining plate around the guiding post; and when the rail slides from the first track end to the center portion of the track, the guiding post rotates in the guiding groove and slides from the first guiding groove end to the second guiding groove end; when the rail slides from the center portion of the track to the second track end, the guiding post rotates in the guiding groove and slides from the second guiding groove end to the first guiding groove end.

13. The rotating mechanism claimed in claim 12, wherein the biasing member includes a first biasing member end and a second biasing member end; the first biasing member end is retained to the retaining plate and the second biasing member is retained to the rail.

14. The rotating mechanism claimed in claim 13, wherein the first biasing member end defines a first latching hole, the retaining plate defines a retaining bore; a retaining post is inserted in the first latching hole and the retaining bore to retain the first biasing member end to the retaining plate.

15. The rotating mechanism claimed in claim 14, wherein the retaining bore is spaced apart from the track; the distance between the retaining bore and the first track end is equal to the distance between the retaining bore and the second track end.

16. The rotating mechanism claimed in claim 12, wherein the guiding groove is spaced apart from the track, and the distance between the first track end and the first guiding groove end is equal to the distance between the second track end and the first guiding groove end.

17. The rotating mechanism claimed in claim 12, wherein the guiding post is retained in a securing hole defined in the rotating plate.

18. The rotating mechanism claimed in claim 17, wherein the distance between the securing hole and the retaining hole is equal to the distance between the second guiding groove end and a center portion of the track so when the rotating mechanism is in the intermediate state, the guiding post can locate at the second guiding groove end.

19. An electronic device, comprising:
an upper housing;
an lower housing; and
a rotating mechanism comprising:
    a retaining plate mounted to the lower housing and having a track defined therethrough and extending along a first direction, the retaining plate having a guiding groove defined therethrough and extending along a second direction perpendicular to the first direction;
    a rotating plate mounted to the upper housing;
    a rail slidably engaging with the track and retained on the rotating plate;
    a guiding post retained on the rotating plate and slidably engaging with the guiding groove, the rotating plate being capable of rotating in a plane parallel to the plane of the retaining plate by the guiding post;
    a biasing member comprising a first biasing member end and a second biasing member end, the first biasing member end retained on the retaining plate and the second biasing member end retained on the rail, the biasing member configured for exerting a force on the rotating plate and retaining plate causing the rotating plate to automatically rotate after the rotating plate rotates a predetermined amount.

20. The electronic device claimed in claim 19, wherein a distal end of the rail is wider than the track such that the rail will not pass through the track thereby retaining the rotating plate to the retaining plate.

* * * * *